(12) United States Patent
Cousins et al.

(10) Patent No.: US 7,724,400 B2
(45) Date of Patent: May 25, 2010

(54) SIMPLE AND CONFIGURABLE ALL-IN-ONE OPERATOR PANEL

(75) Inventors: Walter K. Cousins, Lexington, KY (US); Kevin R. Cruise, Lexington, KY (US); David K. Murray, Lexington, KY (US); Timothy J. Rademacher, Lexington, KY (US); Michael S. Wilson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1356 days.

(21) Appl. No.: 10/405,517

(22) Filed: Apr. 2, 2003

(65) Prior Publication Data

US 2004/0196509 A1 Oct. 7, 2004

(51) Int. Cl.
*H04N 1/04* (2006.01)

(52) U.S. Cl. ............... 358/474; 358/1.15; 358/518; 358/515; 358/3.23; 382/167; 382/166; 382/164

(58) Field of Classification Search ............ 358/474, 358/1.15, 442, 402, 500, 527, 3.22, 3.23, 358/505, 501, 515, 518; 382/167, 164, 166, 382/274
See application file for complete search history.

(56) References Cited

U.S. PATENT DOCUMENTS

| | | | |
|---|---|---|---|
| 5,321,531 A * | 6/1994 | Hasebe et al. ............ 358/505 |
| 5,477,335 A * | 12/1995 | Tai ........................... 358/2.1 |
| 5,710,824 A | 1/1998 | Mongeon | |
| 5,990,876 A | 11/1999 | Shyu | |
| 6,035,058 A | 3/2000 | Savakis et al. | |
| 6,075,887 A | 6/2000 | Brett | |
| 6,118,895 A * | 9/2000 | Hirota et al. ............. 382/165 |
| 6,154,288 A | 11/2000 | Watanabe | |
| 6,330,076 B1 | 12/2001 | Imaizumi et al. | |
| 6,351,557 B1 | 2/2002 | Gonsalves | |
| 6,453,068 B1 | 9/2002 | Li | |
| 6,801,340 B1 * | 10/2004 | Endo ......................... 358/403 |
| 7,046,394 B2 * | 5/2006 | Yasunobu .................. 358/1.9 |
| 7,054,040 B2 * | 5/2006 | Shoda et al. .............. 358/474 |
| 7,072,506 B1 * | 7/2006 | Hirota et al. .............. 382/162 |
| 2001/0012397 A1 | 8/2001 | Kato | |
| 2002/0051259 A1 * | 5/2002 | Yasunobu .................. 358/518 |
| 2002/0054329 A1 * | 5/2002 | Hiraoka .................... 358/1.15 |
| 2002/0093698 A1 | 7/2002 | Kagawa | |
| 2002/0099778 A1 * | 7/2002 | Kogure et al. ............. 709/206 |
| 2002/0114513 A1 | 8/2002 | Hirao | |
| 2002/0136447 A1 | 9/2002 | Link et al. | |
| 2003/0151782 A1 * | 8/2003 | Watanabe .................. 358/539 |

(Continued)

*Primary Examiner*—Negussie Worku
(74) *Attorney, Agent, or Firm*—Taylor & Aust, PC

(57) ABSTRACT

A multifunction machine user interface has a minimal number user inputs, such as only one or two buttons. When a user places a media item, such as a printed sheet, in the scanner and activates a first user input, the machine scans the media item and assesses or determines whether the media item is to be treated for printing purposes as a color document, a color photograph, a monochrome (i.e., black-and-white) document, or a monochrome photograph. The machine then causes the media item to be printed in accordance with that assessment or determination. The assessment or determination can be made automatically by the machine or a host computer in communication with the machine in response to an evaluation of chrominance and luminance of the scanned pixels. Alternatively, the determination can be made by the user selecting corresponding settings through a user interface on the host computer.

6 Claims, 5 Drawing Sheets

U.S. PATENT DOCUMENTS

2004/0190072 A1* 9/2004 Li et al. ..................... 358/3.22
2006/0280362 A1* 12/2006 Umeda ....................... 382/167
2007/0002180 A1* 1/2007 Thakur ....................... 348/638

* cited by examiner

SIMPLE AND CONFIGURABLE ALL-IN-ONE OPERATOR PANEL

BACKGROUND

So-called "multifunction" or "all-in-one" machines that perform some combination of scanning, printing, copying, facsimile and other tasks typically have operator panels with a large assortment of buttons and status indicators (e.g., LEDs). The user or operator must master the use of the buttons or other user inputs to operate the machine. For example, the operator panel of a LEXMARK X73 All-In-One machine has eight buttons and two LEDs, with the buttons being used for: (1) Setup; (2) Color Copy; (3) Black Copy; (4) Scan; (5) Scan to e-mail; (6) Scan to Fax; (7) Paper Feed; and (8) Power. One LED indicates power-on, and the other indicates system status.

The use of multiple buttons and status indicators can be uneconomical to implement, take up space on the operator panel, and simply be confusing to an operator. The meaning or function of each button can be especially confusing if it is labeled only with an icon, as is typical in commercially available all-in-one machines.

Therefore, there is a need for a simplified, economical and easy to use user interface for an all-in-one or multifunction machine that performs some combination of scanning, printing, copying and facsimile functions. The present invention addresses these needs and others in the manner described below.

SUMMARY

The present invention relates to a multifunction machine user interface having an operator panel with a minimal number user inputs. The user inputs can be electromechanical or electronic buttons, virtual buttons on a touch-screen or similar type of display, or any other suitable type of discrete user inputs. When a user places a media item, such as a printed sheet, in the scanner and activates a first user input (e.g., presses a button), the machine scans the media item and assesses or determines whether the media item is to be treated for printing purposes as a color document, a color photograph, a monochrome (i.e., black-and-white) text document, or a monochrome photograph. The machine then causes the media item to be printed in accordance with that assessment or determination.

In some embodiments of the present invention, there is only one user input on the operator panel, i.e., there is no more than one button or other user input. Activating this user input causes the above-described steps to occur. In such an embodiment, the steps can be effected under the control of a host computer with which the machine is in communication (e.g., via a network or other communication link). Nevertheless, in other embodiments, the machine itself can include a processor that effects these steps.

In embodiments in which a host computer is involved, the host computer can provide a graphical user interface with display menus through which the user can initiate, set up, and control scanning and other functions. This host computer graphical user interface can allow the user to set up the machine by selecting the extent to which the above-described assessment and printing of the media item is performed automatically, i.e., without previous or further input from the user. For example, the user can be given a choice whether to set up the machine for the above-described assessment and printing steps to be performed automatically or instead select to print the media item in every instance in color or in every instance in monochrome or in every instance at a selected resolution (dots per inch), until such time as the user sets up the machine otherwise.

Automatic assessment of whether the media item is more likely in color or monochrome can be performed, for example, by the machine scanning in color and evaluating the mean luminance of the scanned pixels against a threshold above which the media item is believed to be more likely in color than monochrome. Automatic assessment of whether the media item is more likely a document or a photograph can be performed, for example, by the machine comparing the number of scanned pixels having a luminance above a threshold value to a threshold number believed indicative of the relatively large amount of white space that would more likely be found in a (primarily text) document than a photograph.

In other embodiments of the present invention, there are exactly two user inputs on the machine. Activating one of the inputs causes the above-described scanning, image assessment and printing steps to occur automatically. Activating the other button causes the machine to, rather than scan the image and make an automatic assessment or determination of the nature of the media item, bring up the graphical user interface on the host computer through which the user can then control the scanning and printing operations and options.

BRIEF DESCRIPTION OF DRAWINGS

The accompanying drawings, which are incorporated in and constitute a part of this specification, illustrate exemplary embodiments of the invention, and together with the description, serve to explain the principles of the invention. In reference to the drawings, wherever appropriate, like numbers indicate like parts throughout the views, and wherein.

DETAILED DESCRIPTION

Figure 1:
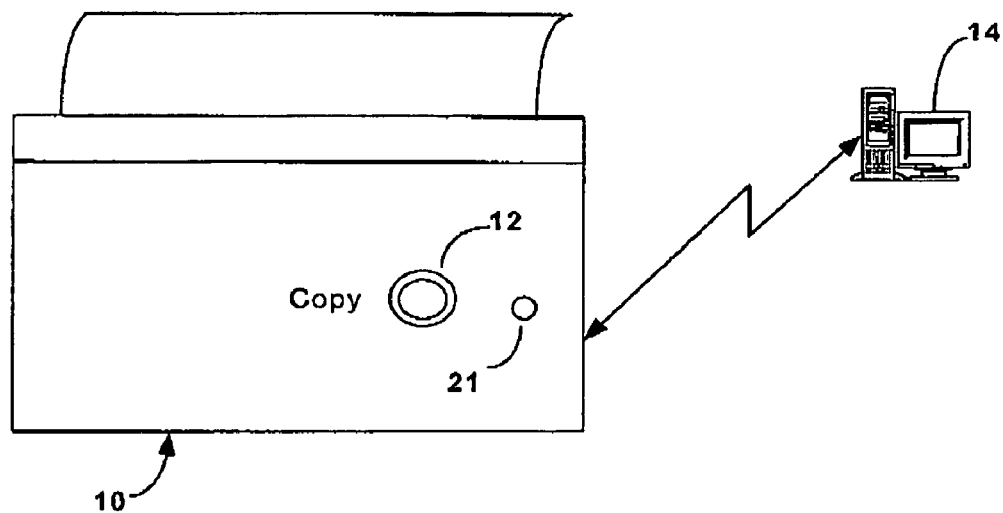
FIG. 1 illustrates a multifunction machine having only one user interface button.

As illustrated in FIG. 1, in an embodiment of the invention, a multifunction machine 10 has only one button 12 accessible to users. In other words, button 12 serves as the sole user input of machine 10. As described below, button 12 can be pressed or otherwise activated by a user to initiate a copying function. Button can be labeled with a textual notation to indicate a "Copy" function or, more preferably, a graphic or icon (not shown) to indicate the same. Machine 10 is connected to a host computer 14 via a universal serial bus (USB) connection or other suitable connection. As described below, the copying function can be performed under control of host computer 14 in some embodiments. Nevertheless, in other embodiments (not shown), in which there is no such host computer, the copying function can be performed under control of machine 10 alone.

Figure 2:
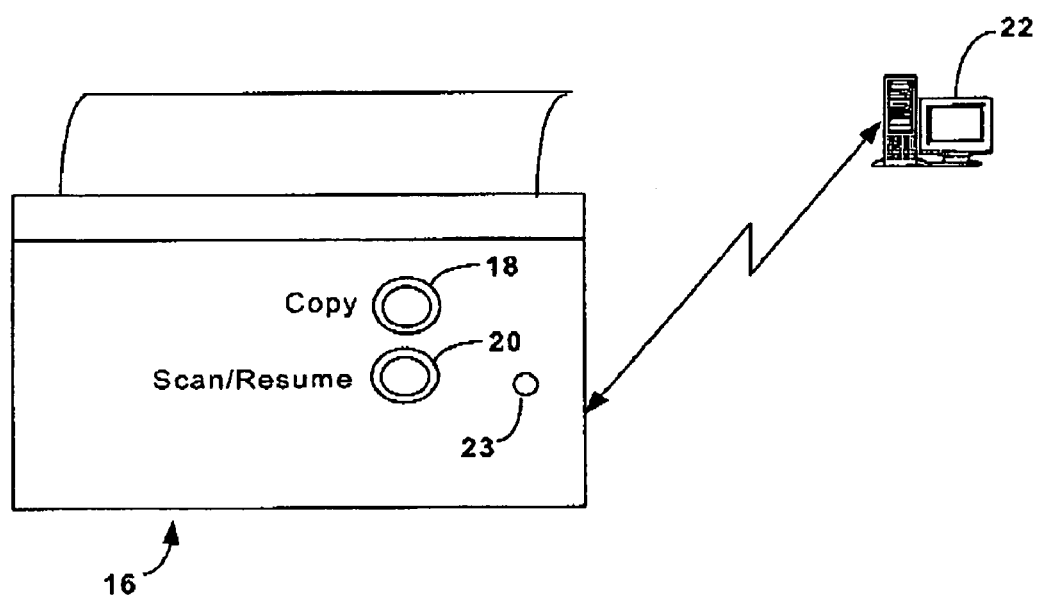
FIG. 2 illustrates a multifunction machine having only two user interface buttons.

As illustrated in FIG. 2, in a similar embodiment of the invention, a multifunction machine 16 has only two buttons 18 and 20 and is similarly connected to a host computer 22 via a USB or other suitable connection. Button 18 can be labeled with a textual notation to indicate a "Copy" function or, more preferably, a graphic or icon to indicate the same. Button 20 can be labeled with a textual notation to indicate a "Scan" function or, more preferably, a graphic or icon (not shown) to indicate the same. As described below, button 18 can be pressed to initiate a copying function, and button 20 can be pressed to initiate a scan function. Button 18 can also be used to cause copying to resume after a paper-out condition, or to cause a paper feed to occur (e.g., if button 18 is pressed and held depressed for more than some predetermined number of seconds, such as three seconds). As described below, the copying and scanning functions can be performed under control of host computer 22 in some embodiments. For example, pressing button 20 can cause host computer 22 to launch a scanning program having a graphical user interface (not shown) through which a user can select options and initiate scanning. Nevertheless, in other embodiments (not shown), in which there is no such host computer, these functions can be performed under control of machine 16 alone. Each of machines 10 and 16 also has a single status LED 21 and 23, respectively.

By having only one, or at most two, buttons or other such user inputs, operation of machine 10 or 16 is made simple and its manufacture made more economical. As described below, one aspect of the invention is that some of the user interface functionality that would conventionally be provided through buttons on the machine itself can be provided through host computer 14 or 22.

The buttons can be mounted on or in the machines of the present invention in any suitable manner, such as on an operator panel (not shown) easily accessible to an operator or user. Note that the term "operator panel" is used in this patent specification for convenience and to refer generally to possible commercial embodiments of the invention, and is not intended to limit the scope of the invention in any way. The placement of the buttons and other such ergonomic or industrial design considerations are not relevant to the invention, except to the extent that the buttons must be accessible to a user.

Figure 3:
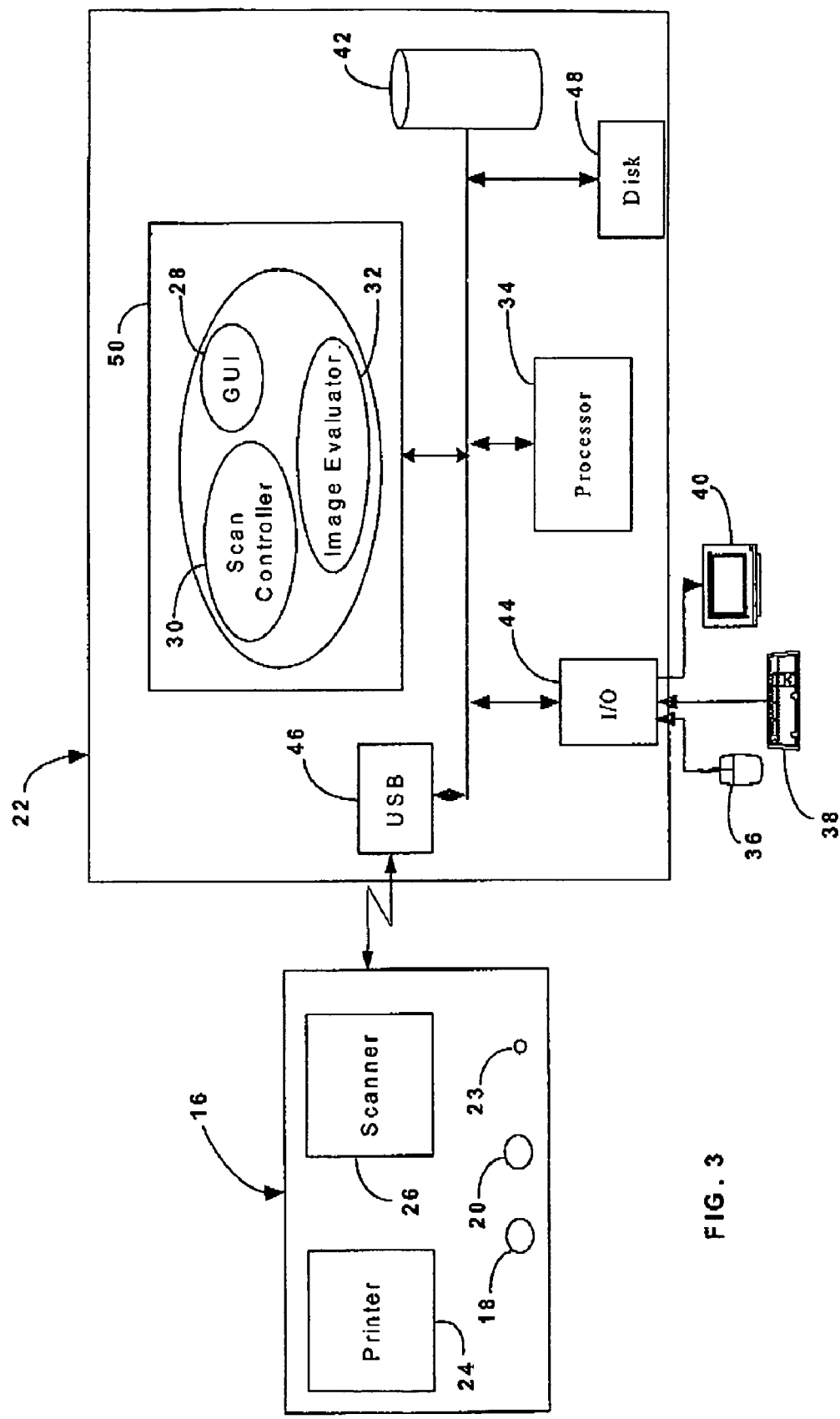
FIG. 3 is a block diagram of a multifunction machine.

The block diagram of FIG. 3 serves to illustrate either of the above-described embodiments in further detail but is directed more specifically to the two-button embodiment (see FIG. 2) because its functionality essentially encompasses that of the one-button embodiment (FIG. 1). Thus, the one-button embodiment is not separately illustrated in block diagram form for purposes of clarity.

As illustrated in FIG. 3, machine 16 further includes a printer subsystem 24 and a scanner subsystem 26, which may be mounted on or in machine 16 in any suitable manner. Subsystems 24 and 26 can include any suitable electronic and mechanical elements that together effect scanning and printing functions of the type that conventionally occur in commercially available multifunction machines. Such elements are well-understood by persons skilled in the art to which the invention relates. Therefore, subsystems 24 and 26 and the mechanical and other details of the manner in which they are constructed and communicate with one another and other subsystems to perform scanning and printing functions are not described in further detail in this patent specification. As indicated above, although not separately illustrated, machine 10 comprises essentially the same scanning and printing subsystems and other elements as machine 16.

Host computer 22 can be a conventional personal computer, a server computer, or any other suitable computer or computer system. Host computer 22 executes software related to the present invention that includes a graphical user interface (GUI) 28 that operates in accordance with conventional windowing GUI paradigms. The software further includes a scan controller 30 and an image evaluator 32. In other words, the processor 34 of computer 22 is programmed to effect the functions described below in further detail with regard to these software elements. In accordance with the GUI paradigm, host computer 22 further includes a suitable pointing device such as a mouse 36, as well as a keyboard 38 and a display device 40. Host computer 22 also includes other hardware and software elements of the types generally included in conventional personal computers, such as a hard disk drive 42, input/output interfaces 44, a universal serial bus (USB) interface 46 or other suitable communications interface, and a removable read/write storage device 48 such as a drive that uses a compact disc (CD), DVD or floppy disk.

The software elements of the programmed computer 22 are conceptually shown for purposes of clarity and illustration as executable in a main memory 50, but as persons skilled in the art understand they may not in actuality reside simultaneously or in their entireties in memory 50. As with any software, elements may be stored on disk drive 42 and fetched into memory 50 on an as-needed basis. Other software elements of the types conventionally included in personal computers, such as an operating system and communications software, are also included but not shown for purposes of clarity.

Figure 4:
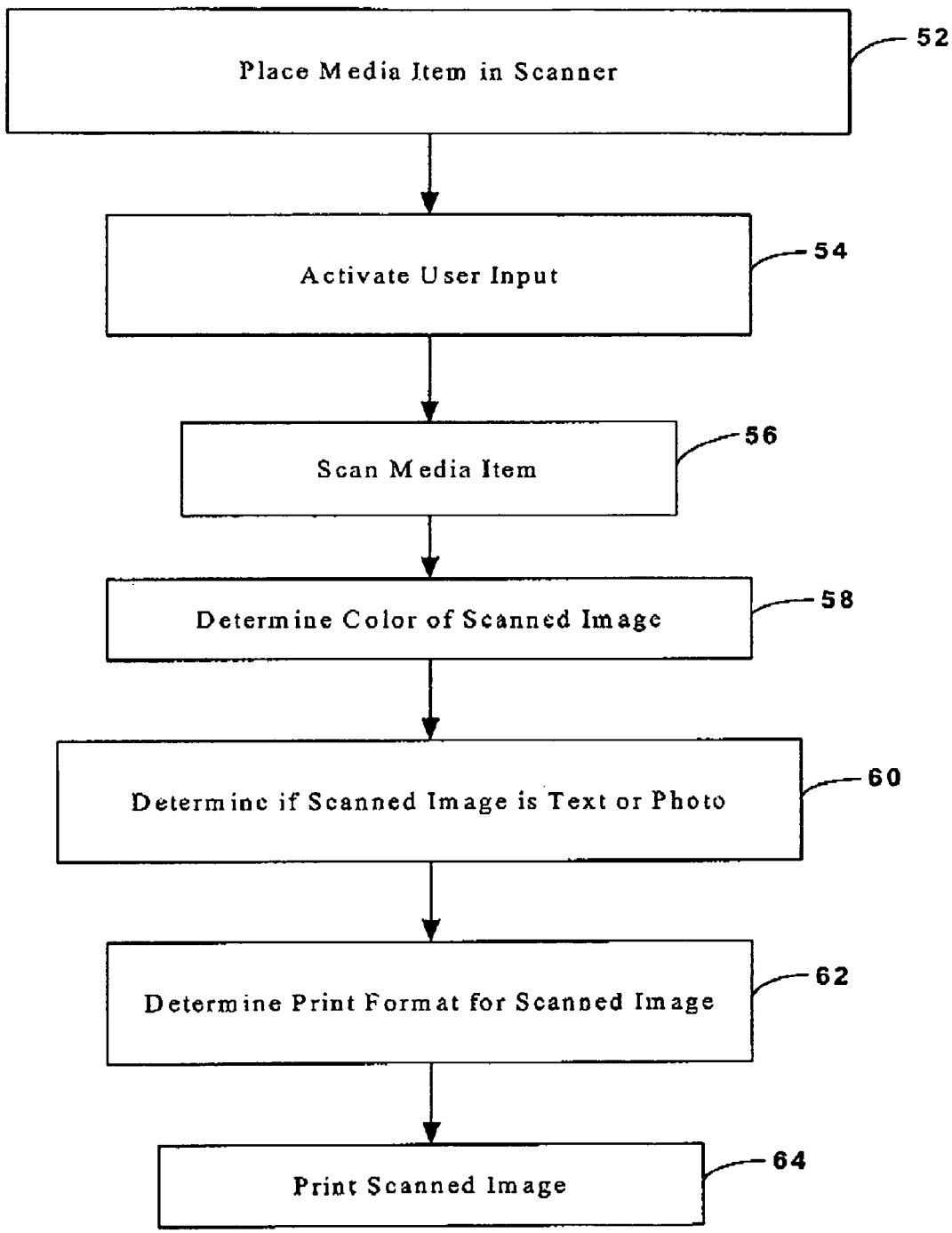
FIG. 4 is a flow diagram illustrating a method of operation of the machine.

A method of operation in accordance with the present invention is illustrated by the flow diagram of FIG. 4. At step 52, a user places a media item, such as a printed text document or photograph, in the paper tray or other appropriate scanner portion of machine 10 or 16. The media item can be, for example, a printed monochrome (black-and-white) document that is all or primarily text, a printed color document that is primarily text, a print that is a color photographic image or consists essentially of a color photographic image, or a print that is a monochrome photographic image or consists essentially of a monochrome photographic or similar image. Although other media items can be scanned in accordance with the invention, identifying the media item as belonging to one of these four categories is a relevant aspect of the invention.

At step 54, the user presses or otherwise activates the Copy button to initiate a Copy function. That is, the user wishes to have the machine scan the media item and then print the scanned image, thereby producing a copy of the media item. In some embodiments of the invention, such as the two-button embodiment (FIG. 2), activation of the Scan/Resume button causes host computer 22 to, rather than perform a scan and print the image as an integrated sequence of operations, launch scan controller (software) 30, with which the user can interact via GUI 28 to set scan parameters and options and initiate scanning. When the user initiates scanning, e.g., clicks on a Start button (not shown) displayed by GUI 28 host computer 22 causes machine 16 to scan the media item at step 56. The scan is performed in color (e.g., for each pixel, red, green and blue pixel values (RGB data) are obtained) and at a suitable resolution, such as 300 dots-per-inch (dpi). Alternatively, in other embodiments of the invention, such as the one-button embodiment (FIG. 1), scanning can proceed automatically at step 56 in response to the user pressing the Copy button, without the user interacting directly with scan controller 30. Although these respective methods of operation are described for illustrative purposes with specific regard to either the one-button embodiment (FIG. 1) or the two-button embodiment (FIG. 2), either method is suitable for use with a machine having any number of buttons.

Upon completion of the scan, the RGB pixel data representing the scanned image of the media item is received by the host computer. As described in further detail below, the host computer can have been set up earlier by the user to cause the machine to print the scanned image in a variety of ways, such as in color or, alternatively, in monochrome. Still another option that the user can select is to set up the host computer to automatically evaluate the nature of the scanned image and cause the machine to print it in a way that has been pre-associated with images of that nature as being most appropriate. For example, based on the host computer's evaluation of the chrominance of the pixel data, the luminance of the pixel data and other factors such as the paper tray from which the media item was fed, the host computer can determine which of the four types of media items described above the scanned image most resembles: color photograph, monochrome photograph, color document, or monochrome document. As known in the art, the printer subsystem of a multifunction machine can be caused to operate in a different manner for printing photograph-like images than the manner in which it operates for printing text documents. For example, photographs are typically printed at higher resolutions (dots per inch) than documents, and techniques such as halftoning can be employed. As similarly known, the printer subsystem of a multifunction machine can be caused to print using black ink only or to print using color inks. Conventionally, with commercially available multifunction machines, the user can manually select, by pressing buttons on the operator panel, the resolution at which the machine is to print a scanned image and whether the machine is to print the scanned image in color or black-only. Such a conventional machine may have buttons to manually select one of three resolutions: draft, normal or photographic quality.

The host computer determines which of the four above-listed media item types it is to print the scanned image as. The host computer can make this determination based upon a default mode or configuration in which the host computer always evaluates the nature of the scanned image and automatically prints it as the appropriate one of the four media types, or based upon a mode that the user has pre-set via GUI 28. As described below, the user can pre-set the mode to cause host computer to print the scanned image as a selected one of the four media item types or can pre-set the mode to cause the host computer to evaluate the scanned image and automatically print it as the appropriate one of the four media types.

Steps 58, 60 and 62 occur if the host computer is set up or otherwise configured to make the determination by evaluating the scanned image and automatically printing it as a color document, a color photograph, a monochrome document or a monochrome photograph in response to the evaluation. If the host computer is set up to make the determination by reading a pre-set mode that the user has selected and printing the scanned image at step 64 as whichever of a color document, a color photograph, a monochrome document or a monochrome photograph that the selected mode indicates, then only those of steps 58, 60 and 62 that may be relevant to the selected mode are performed. Note that not all steps shown in FIG. 4 are performed in every embodiment of the invention; some embodiments may include only a subset of these steps, and others may include additional steps not shown. Also, in other embodiments of the invention, steps can be performed in a different order than that indicated by the arrows between blocks in FIG. 4.

At step 58, the host computer analyzes the color content of the scanned image to determine whether a monochrome copy or a color copy is appropriate. The host computer analyzes the data by initially converting the RGB data of the scanned image to YCbCr colorspace. Pixels with a luminance (Y) value greater than or equal to a predetermined threshold (e.g., 245) are deemed indicative of whitespace and thus not including in the calculation that follows. For the remaining N pixels, the mean sum-of-the-squares of the Cb and Cr values is calculated as:

$$\overline{C} = \frac{\left(\sum_{i}^{N} Cb_i^2 + Cr_i^2\right)}{N}$$

$\overline{C}$ is then compared to a suitable predetermined threshold, such as 45. If $\overline{C}$ is greater than the threshold then a color copy will be performed at step 64; otherwise, a monochrome copy operation will be performed at step 64. If $\overline{C}$ is below the threshold, then host computer transmits only the luminance (Y) data to the machine to make the copy. Table 1 shows the $\overline{C}$ values obtained experimentally for a small sampling of documents scanned at 300 dpi with a LEXMARK CIS scanner:

TABLE 1

| Document Type | Color Content | $\overline{C}$ |
| --- | --- | --- |
| Business Letter | Black text on white paper | 5.8 |
| Business Graphics | Color graphics and multi-colored text | 643.6 |
| Magazine Page | Black text with red header and small color photo | 50.6 |
| Photos | Grayscale photos with black text labels | 10.8 |
| Specification | Black text with two lines highlighted | 40.2 |

It should be noted that the use of YCbCr colorspace to make the above-described color evaluation in the illustrated embodiment of the invention is intended to be merely exemplary, and in other embodiments other well-known colorspaces, such as CIELAB and CIELUV, can be used.

At step 60, the host computer evaluates the scanned image to determine whether it should be printed as a photograph or, alternatively, as a (text) document. As noted above, it is well-known in the art that printing a scanned image as a photograph involves causing the printer to print at a high resolution and can also employ photographic image reproduction techniques such as halftoning, whereas printing a scanned image as a document involves causing the printer to print at a lower resolution and can employ known techniques to enhance the reproduction of text. Such techniques by which the scanned image can be processed and the printer can be controlled to maximize the reproduction of either text or photographic images are well-understood in the art and therefore not described in detail in this patent specification.

An evaluation to determine whether the scanned image is to be printed as a document or, alternatively, as a photograph can include the host computer comparing the amount of whitespace in the scanned image to a predetermined threshold, as indicated by step 60. As noted above, pixels having a luminance (Y) value greater than or equal to a predetermined threshold (e.g., 245) are deemed indicative of whitespace. A scanned image having a relatively large amount of whitespace is believed to more likely be a (text) document than a photograph because documents consist primarily of a relatively low amount of black or other dark-colored text dispersed over a relatively large area of white background, whereas photographs consist primarily of large areas of color of varying value and relatively little area that is pure white or otherwise extremely light in color value.

The host computer can also use other factors in the evaluation, such as the print medium type. For example, whether the media sensor in the paper input tray of the printer indicates that the tray is loaded with plain paper, coated paper, glossy paper, transparency, iron-on transfer, card stock or other medium is indicative of the type of media item to be copied. For example, glossy paper in the paper tray is indicative that the user is attempting to copy a photograph. The following table illustrates how the paper (or other medium) type sensed by the media sensor in the paper tray can be used as an input to the decision as to whether to print the media item as a monochrome (B/W) document, monochrome photograph, color document or color photograph and to what values to set various print parameters (e.g., resolutions and shingling level) for each:

TABLE 2

| | | Copy type | | | |
|---|---|---|---|---|---|
| | | Color Document | Color Photo | B/W Document | B/W Photo |
| Plain paper | Scan data | 24-bit RGB | 24-bit RGB | 1-bit B/W | 8-bit Y |
| | Print resolution | 600 × 600 | 600 × 600 | 600 × 600 | 600 × 600 |
| | Shingling level | 1 color/ 3 black | 2 color/ 3 black | 3 black | 1 black |
| Glossy paper | Print resolution | N/A | 1200 × 1200 | N/A | 600 × 600 |
| | Shingling level | N/A | 4 color/ 0 black | N/A | 4 black |

With regard to Table 2, "scan data" refers to the data passed to the print driver, not the data received from the scanner. "Shingling level" is a term of art referring to the number of shingling passes made, i.e., the number of times the print cartridge passes over each pixel. Note in Table 2 that print resolution and shingling level are not applicable with regard to color photographs. Also note that composite black (CMY) printing is used for glossy color-photograph mode. In addition, note that the media item can be assumed to be a photograph if the scanned image is black/white and the media sensor indicates glossy media in the paper tray.

As noted above, some embodiments of the present invention can provide a menu as part of GUI 28 that allows a user to pre-set, i.e., set in advance of making copies, various parameters or modes related to how the host computer makes the determination whether to print the scanned image as a color document, color photograph, monochrome document or monochrome photograph. For example, some users may wish to scan a color document but have it printed in monochrome (e.g., black) output for lower printing cost and increased speed. In such embodiments, the host computer reads the pre-set mode(s) at step 62.

At step 64 of the illustrated embodiment of the invention, the host computer causes the machine to print the scanned image in accordance with its determination whether to print it as a color document, color photograph, monochrome document or monochrome photograph.

Figure 5:
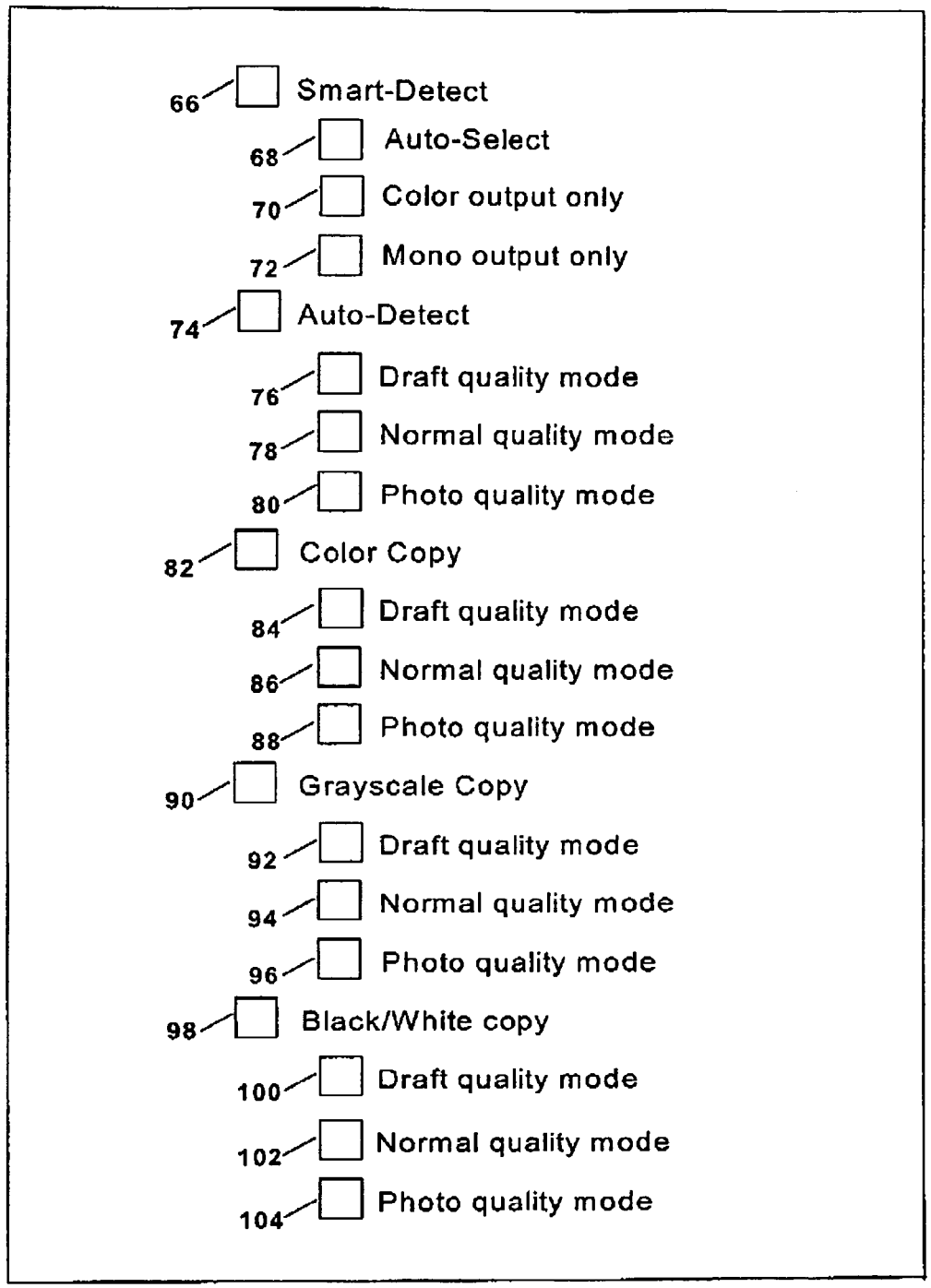
FIG. 5 illustrates the relevant portion of a graphical user interface screen display.

An exemplary host computer GUI screen display through which a user can select pre-set modes is illustrated in FIG. 5. Although checkboxes are illustrated as the GUI structures with which the user interacts in this embodiment, in other embodiments the GUI can use any other suitable well-known structures for this purpose, such as pull-down menus. Note that by pre-setting or setting up the copy function through the host computer rather than through buttons on the multifunction machine itself, the user is less likely to be confused by the only one or two buttons on the machine itself. The user can set up the copy function to suit his or her needs and then quickly and easily make copies that meet those needs simply by pressing the one "Copy" button on the machine. The invention thus minimizes user confusion that could occur if the machine were to have a plethora of buttons.

The user can check a box 66 to have the host computer perform a "Smart-Detect" function in which it evaluates the image as described above with regard to steps 58, 60 and 62. If the user checks box 66, the user then checks one of three sub-boxes 68, 70 and 72. The user can check sub-box 68 to have the host computer evaluate the scanned image as described above with regard to steps 56, 58 and 60 and print it accordingly as a color document, color photograph, monochrome document or monochrome photograph, in response to the evaluation. Alternatively, the user can check sub-box 70 to have the host computer evaluate the scanned image as described above with regard to steps 56, 58 and 60 and print it in color (e.g., at a high resolution if the evaluation indicates the scanned image is of a photograph, or at a lower resolution if the evaluation indicates the scanned image is of a document). Alternatively, the user can check sub-box 72 to have the host computer evaluate the scanned image as described above with regard to steps 56, 58 and 60 and print it in monochrome (e.g., at a high resolution if the evaluation indicates the scanned image is of a photograph, or at a lower resolution if the evaluation indicates the scanned image is of a document).

The user can check a box 74 to have the host computer perform a "Auto-Detect" function in which it evaluates the image as described above with regard to steps 58, 60 and 62 but only to determine whether to print in color or monochrome. If the user checks box 74, the user then checks one of three sub-boxes 76, 78 and 80. The user can check sub-box 76 to have the host computer evaluate the scanned image and print it in a "Draft quality" or relatively low-resolution mode. Alternatively, the user can check sub-box 78 to have the host computer evaluate the scanned image and print it in a "Normal quality" or medium-resolution mode. Alternatively, the user can check sub-box 80 to have the host computer evaluate the scanned image and print it in a "Photo quality" or high-resolution mode.

The user can check a box 82 to have the host computer perform a "Color Copy" function in which it does not evaluates the scanned image but rather in every instance causes the scanned image to be printed in color at a selected resolution. If the user checks box 82, the user then checks one of three sub-boxes 84, 86 and 88, to select a "Draft quality" or relatively low-resolution mode, a "Normal quality" or medium-resolution mode, or a "Photo quality" or high-resolution mode.

The user can check a box 90 to have the host computer perform a "Grayscale Copy" function in which it does not evaluates the scanned image but rather in every instance causes the scanned image to be printed by halftoning in monochrome at a selected resolution. If the user checks box 90, the user then checks one of three sub-boxes 92, 94 and 96, to select a "Draft quality" or relatively low-resolution mode, a "Normal quality" or medium-resolution mode, or a "Photo quality" or high-resolution mode.

The user can check a box 98 to have the host computer perform a "Black/White Copy" function in which it does not evaluates the scanned image but rather in every instance causes the scanned image to be printed in black and white at a selected resolution. That is, any pixel below a predetermined threshold luminance value is printed a black dot, and for every pixel at or above that threshold nothing is printed, i.e., the paper remains white at that pixel location. If the user checks box 98, the user then checks one of three sub-boxes 100, 102 and 104, to select a "Draft quality" or relatively low-resolution mode, a "Normal quality" or medium-resolution mode, or a "Photo quality" or high-resolution mode.

As stated above, in response to the determination whether to print the media item as a monochrome document, monochrome photograph, color document or color photograph, the machine can set print parameters to values appropriate for those media item types. The print parameters can include: half-toning algorithm, shingling modes, carrier speed, print direction, and print resolution. Tables readable by the processor define what parameters are deemed "appropriate" for the media item type and allow the processor to set the parameters. For example, a table (not shown) along the lines of Table 2 can indicate that a fast halftoning algorithm is to be applied to all modes except Photo quality, to which a higher-quality but slower-to-calculate halftoning algorithm is to be applied. As noted above, the shingling modes determine the number of passes the print cartridge makes over each pixel. A table can indicate that, in a printer having two print cartridges, one with only black ink (K) and the other with cyan, magenta and yellow (CMY) inks, some print modes are to use a different shingling mode if the image is to be printed using only the black (K) cartridge than is to be used if the image is to be printed using the color (CMY) cartridge. With regard to carrier speed, the table can indicate that if the print medium is plain paper, a fast carrier speed of, for example, 40 inches per second (in./s) is to be used in draft quality mode, a medium carrier speed of, for example, 30 in./s is to be used in color modes, and a slow carrier speed of 20 in./s is to be used to in monochrome modes in draft, normal, and photo quality modes. The print direction is either bi-directional or unidirectional. The resolution for plain paper is 300×600 (quick), 600×600 (normal), or 1200×1200 (better). The resolution for glossy paper is 600×600 (quick), 1200×1200 (normal), or 2400×1200 (better).

With regard to the manually-selected modes, i.e., those modes other than Smart-Detect and Auto-Detect, the scan resolution for a copy can be set in response to the quality level that the user selects. (See FIG. 5.) In other words, ordinarily, the copy scan resolution is determined in response to both the copy type (i.e., color or black-and-white, document or photo) and the quality setting (draft, normal, or photo quality). Nevertheless, in the Smart-detect and Auto-Detect modes, the copy type is unknown before the scan is performed. Therefore, in the Auto-Detect mode when a quality is selected, the scan is performed in the highest resolution needed for the selected quality level. For example, 150 dpi for draft quality, 300 dpi for normal quality, and 600 dpi for photo quality. In Smart-Detect mode, the scan is performed at 300 dpi.

In some embodiments of the invention, GUI 28 also allows a system operator to resume printing after a paper-out condition by clicking on a "Continue" option (not shown) displayed on the GUI screen. Such a function is believed not found in commercially available multifunction machines that communicate with a host computer via a Universal Serial Bus (USB) port because, among other reasons, the printer subsystem's bulk communications pipe would be full from the host computer system transmitting print data to the printer subsystem before the host computer system receives a paper-out alert on the bulk-in pipe. If the host computer were to send a load-paper command to the multifunction machine on the bulk pipe, the printer subsystem would not process it until it had processed the print data, and the multifunction machine would not process the print data until the paper were loaded.

The above-described problem can be solved by using the USB control pipe to transmit a paper feed request from the host to the multifunction machine rather than using the USB bulk pipe or some other means. The term "pipe" is used in the art as well as in the specification for the well-known USB standard to refer to a connection between two logical devices over which data can be sent. Pipes and their general use are not described in this patent specification because they are well-known to persons skilled in the art to which the invention relates. As such persons understand, the USB standard defines four types of transfers: control, bulk, interrupt and isochronous. Each pipe uses one and only one of these transfer types. According to the USB standard, a USB device must accept a request on the control pipe at any time while the device is in the configured state. Furthermore, the USB control pipe allows requests, such as Load Paper, Clear Job and Power Off to be flexibly defined or set up via the host computer rather than hard-coded or hard-implemented in the multifunction machine itself.

Figure 6:
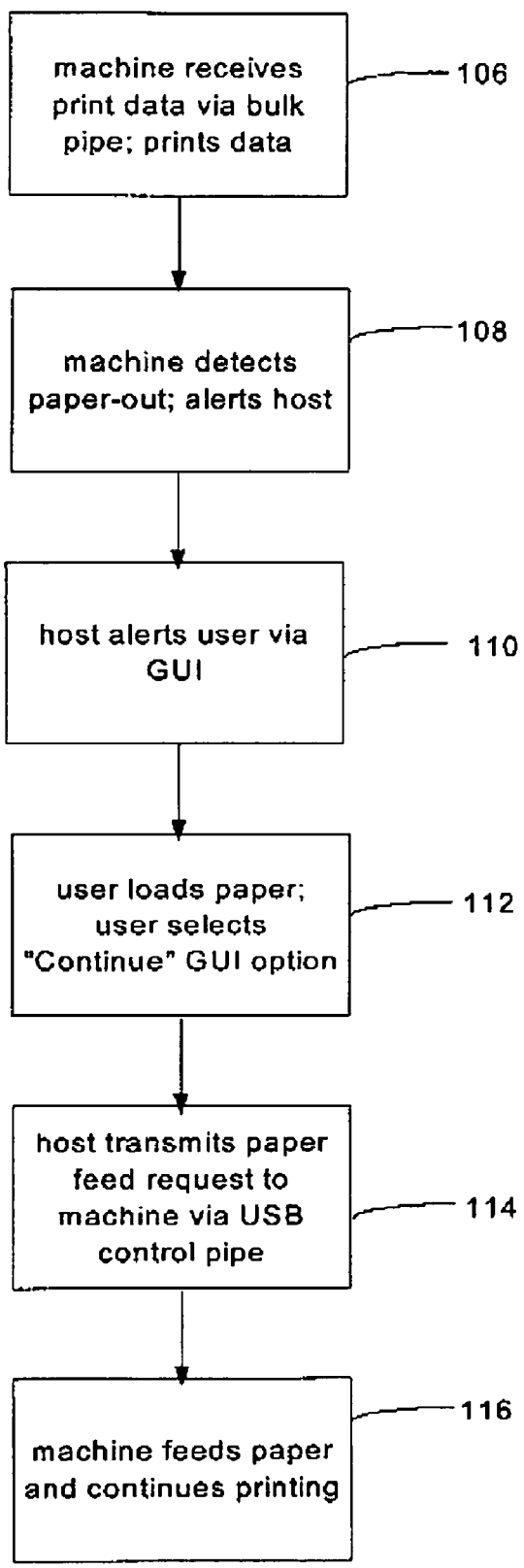
FIG. 6 is a flow diagram illustrating a method of obtaining user input during the occurrence of a paper-out event during printing.

As illustrated in FIG. 6, step 106 indicates that the host computer transmits print data to the printer subsystem in the normal manner on the USB bulk-out pipe. So long as the printer subsystem is not out of paper, it prints the data in the normal manner. At some time during this process, the printer subsystem runs out of paper on which to print. The presence of print data causes the printer subsystem to automatically attempt to feed paper, but the paper feed operation fails. As indicated by step 108, in response to a failed paper read operation, the machine transmits an alert to the host computer on the bulk-in pipe. As indicated by step 110, in response to being alerted of the out-of-paper condition, the host computer displays a message (not shown) on GUI 28 (FIG. 3) to alert the user that paper needs to be loaded. At step 112, after the user loads paper, the user uses GUI 28 to indicate that paper is loaded. For example, there can be a virtual button or other such option labeled "Continue" (not shown) that the user can select. At step 114, the selection of the Continue option causes the host computer to send a paper feed request (i.e., a Load Paper request) to the machine on the USB control pipe. At step 116, the printer subsystem responds by feeding paper and printing the scanned image.

The host computer can similarly send a request to the machine to clear a print jam or in response to the user clicking on a "Cancel" option (not shown) on GUI 28 after, for example, noting an out-of-paper condition. In response to receiving the request to clear the print job (i.e., a Clear Job request), the machine flushes the data from the USB bulk pipe until it receives an End of Job command from the host computer. The host computer can then send the remainder of the print swath, followed by an End of Job command, so that the printer subsystem knows when to stop flushing data.

In another aspect of the present invention, the "Power" button that is conventionally included in multifunction machines is not present in the illustrated embodiment of the invention, thereby further minimizing the number of buttons. Power is continually present in certain portions the machine, but the machine switches from a dormant state in which only a portion of the circuitry is powered to a ready state in which all of the relevant scanning and printing circuitry is powered when a Scan, Copy, or Print operation is initiated, either through GUI 28 on the host computer or by pressing a button on the machine itself. In other words, in response to the user activating a user input (e.g., pressing the Copy button in the single-button embodiment shown in FIG. 1 or the Scan/Resume button in the two-button embodiment shown in FIG. 2), the machine applies power to some of its then-dormant circuitry, including that of the scanner subsystem and printer subsystem. Shutdown or power-down of the machine is achieved by employing an activity timeout. After some predetermined number of minutes of inactivity that the processor can time, the machine removes power from some of its subsystems to return the machine to the dormant state. In addition or alternatively, as described above, a user can power the machine down using GUI 28. The multifunction machine can also automatically shut down or power down when the host computer is suspended or shut down. In such embodiments, the host can send a Power Off request to the machine to simulate a user pressing one. A Power Off request on the USB control pipe can be sent in addition to a power-off command on the USB bulk pipe to insure that the machine can be turned off and thereby reset for error conditions.

In view of the foregoing specification, other embodiments of the invention will readily occur to those skilled in the art to which the invention relates. It is intended that the specification be considered as exemplary only, and that the scope of the invention be limited only by the claims.

What is claimed is:

1. A method for operating a multifunction machine having a printer and scanner, comprising:
    placing a media item in the scanner;
    activating a first user input of the multifunction machine;
    scanning the media item to produce a scanned image in response to activation of the first user input;
    determining whether to print the scanned image as a color document, a color photograph, a monochrome document or a monochrome photograph; and
    printing the scanned image as a color document, a color photograph, a monochrome document or a monochrome photograph in response to the determining step, wherein the determining step comprises evaluating the chrominance of a plurality of scanned image pixels against a predetermined threshold value, and
    wherein the evaluating step comprises:
        converting the scanned image from RGB colorspace into YCbCr colorspace;
        calculating a mean sum of squared Cb and Cr chrominance values for image pixels having a luminance value below said predetermined threshold value indicative of whitespace;
        determining to print the scanned image in color if the calculated mean sum value of the squared Cb and Cr chrominance values is greater than said predetermined threshold value; and
        determining to print the scanned image in monochrome if the calculated mean sum value of the squared Cb and Cr chrominance values is less than said predetermined threshold value.

2. The method of claim 1, wherein a host computer receives the scanned image and automatically performs the evaluating step in response thereto.

3. A method for operating a multifunction machine having a printer and scanner, comprising:
    placing a media item in the scanner;
    activating a first user input of the multifunction machine;
        scanning the media item to produce a scanned image in response to activation of the first user input;
        determining whether to print the scanned image as a color document, a color photograph, a monochrome document or a monochrome photograph;
    printing the scanned image as a color document, a color photograph, a monochrome document or a monochrome photograph in response to the determining step; and
    activating a second user input of the multifunction machine, wherein:
        in response to activation of the first user input a host computer in communication with the multifunction machine receives the scanned image and automatically performs the determining step by evaluating the chrominance of a plurality of scanned image pixels against a predetermined threshold value; and
        in response to activation of the second user input the host computer controls the scanning and printing steps and causes the determining and printing steps to be performed in response to use of a graphical user interface, and
    wherein the evaluating step comprises:
        converting the scanned image from RGB colorspace into YCbCr colorspace;
        calculating a mean sum of squared Cb and Cr chrominance values for image pixels having a luminance value below said predetermined threshold value indicative of whitespace;
        determining to print the scanned image in color if the calculated mean sum value of the squared Cb and Cr chrominance values is greater than said predetermined threshold value; and
        determining to print the scanned image in monochrome if the calculated mean sum value of the squared Cb and Cr chrominance values is less than said predetermined threshold value.

4. A system, comprising:
a scanner for producing a scanned image of a media item;
a first user input;
    a processing system comprising one or more processing elements programmed or adapted to determine whether to print the scanned image as a color document, a color photograph, a monochrome document or a monochrome photograph; and
    a printer for printing the scanned image as a color document, a color photograph, a monochrome document or a monochrome photograph in response to the determination,
    wherein the processing system evaluates the chrominance of a plurality of scanned image pixels against a predetermined threshold value, and
    wherein the processing system is programmed or adapted to determine whether to print the scanned image as a color document, a color photograph, a monochrome document or a monochrome photograph by performing the steps of:
    converting the scanned image from RGB colorspace into YCbCr colorspace;
    calculating a mean sum of squared Cb and Cr chrominance values for image pixels having a luminance value below said predetermined threshold value indicative of whitespace;
    determining to print the scanned image in color if the calculated mean sum value of the squared Cb and Cr chrominance values is greater than said predetermined threshold value; and
    determining to print the scanned image in monochrome if the calculated mean sum value of the squared Cb and Cr chrominance values is less than said predetermined threshold value.

5. The system of claim 4, wherein a host computer having the processing system is in communication with a multifunction machine having the scanner and printer.

6. A system, comprising:
- a scanner for producing a scanned image of a media item;
- a first user input;
    - a processing system comprising one or more processing elements programmed or adapted to determine whether to print the scanned image as a color document, a color photograph, a monochrome document or a monochrome photograph; and
- a printer for printing the scanned image as a color document, a color photograph, a monochrome document or a monochrome photograph in response to the determination,
- wherein a multifunction machine has the first user input, a second user input, the scanner and the printer, and is in communication with a host computer having the processing system, and wherein:
    - in response to activation of the first user input the host computer receives the scanned image and automatically determines whether to print the scanned image as a color document, a color photograph, a monochrome document, a monochrome photograph by evaluating the chrominance of a plurality of scanned image pixels against a predetermined threshold value; and
    - in response to activation of the second user input the host computer controls the production and printing of the scanned image in response to use of a graphical user interface, and
- wherein the processing system is programmed or adapted to determine whether to print the scanned image as a color document, a color photograph, a monochrome document or a monochrome photograph by performing the steps of:
- converting the scanned image from RGB colorspace into YCbCr colorspace;
- calculating a mean sum of squared Cb and Cr chrominance values for image pixels having a luminance value below said predetermined threshold value indicative of whitespace;
    - determining to print the scanned image in color if the calculated mean sum value of the squared Cb and Cr chrominance values is greater than said predetermined threshold value; and
    - determining to print the scanned image in monochrome if calculated mean sum value of the squared Cb and Cr chrominance values is less than said predetermined threshold value.

* * * * *